(12) United States Patent
Wolinsky

(10) Patent No.: US 7,063,619 B2
(45) Date of Patent: *Jun. 20, 2006

(54) METHOD AND APPARATUS FOR IDENTIFYING GAME PLAYERS AND GAME MOVES

(75) Inventor: Scott Wolinsky, Sewell, NJ (US)

(73) Assignee: Interactive Telegames, LLC, Suffern, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/823,877

(22) Filed: Mar. 29, 2001

(65) Prior Publication Data

US 2002/0142839 A1  Oct. 3, 2002

(51) Int. Cl.
*A63F 13/00* (2006.01)

(52) U.S. Cl. .................. 463/41; 379/88.21; 379/93.23; 379/433.07

(58) Field of Classification Search .................... 463/1, 463/30, 36–42; 700/90–92, 94; 379/88.21, 379/88.23, 88.24, 93.17, 93.18, 93.19, 93.21, 379/93.23, 93.27, 433.06, 433.07, 457
See application file for complete search history.

(56) References Cited

U.S. PATENT DOCUMENTS

| | | | | |
|---|---|---|---|---|
| 3,932,709 A | * | 1/1976 | Hoff et al. | 379/157 |
| 4,242,539 A | * | 12/1980 | Hashimoto | 379/142.01 |
| 4,372,558 A | | 2/1983 | Shimamoto et al. | |
| 5,061,992 A | * | 10/1991 | Ueno | 348/14.01 |
| 5,186,471 A | | 2/1993 | Vancraeynest | |
| 5,236,199 A | * | 8/1993 | Thompson, Jr. | 348/14.05 |
| 5,273,288 A | | 12/1993 | Teshima et al. | |
| 5,349,633 A | * | 9/1994 | Katz | 379/189 |
| 5,518,253 A | * | 5/1996 | Pocock et al. | 463/19 |
| 5,558,339 A | * | 9/1996 | Perlman | 463/23 |
| 5,563,931 A | * | 10/1996 | Bishop et al. | 379/37 |
| 5,671,267 A | * | 9/1997 | August et al. | 455/420 |
| 5,679,077 A | * | 10/1997 | Pocock et al. | 463/19 |
| 5,793,846 A | * | 8/1998 | Katz | 379/127.01 |
| 5,864,613 A | * | 1/1999 | Flood | 379/188 |
| 5,907,604 A | * | 5/1999 | Hsu | 348/14.01 |
| 5,971,849 A | * | 10/1999 | Falciglia | 463/16 |
| 5,971,855 A | | 10/1999 | Ng | |
| 6,080,064 A | | 6/2000 | Pieterse et al. | |

(Continued)

OTHER PUBLICATIONS

GENCO Tic Tac Phone Description From GENCO Website.

*Primary Examiner*—Scott Jones
(74) *Attorney, Agent, or Firm*—Paul Lerner; Anatoly S. Weiser

(57) ABSTRACT

A method and apparatus is disclosed for simultaneously indicating on each of a plurality of communication terminals, instructions transmitted by each terminal and the identity of the respective terminals that transmitted the instructions. Such a feature can be used to indicate the moves of parties playing a game over a telephone line. Once a communications link is established between two or more parties, their terminals are placed in a game mode which activates inband signal detection and player identification circuitry located within the terminals. Multi-colored indicators and player identification displays at each terminal are activated, their color being dependent upon the source of received instructions. In one embodiment, player identification indicators may be incorporated into a touch tone keypad located on the terminals. The keypad's touch tone keys are modified such that each key has two or more color coded indicators incorporated within, each color representing a particular player's move.

26 Claims, 14 Drawing Sheets

U.S. PATENT DOCUMENTS

| | | | |
|---|---|---|---|
| 6,231,441 B1 * | 5/2001 | Golad | 273/237 |
| 6,241,612 B1 * | 6/2001 | Heredia | 463/40 |
| 6,244,960 B1 * | 6/2001 | Takasaka et al. | 463/37 |
| 6,264,562 B1 * | 7/2001 | McSheffrey et al. | 463/42 |
| 6,278,773 B1 * | 8/2001 | Perlman et al. | 379/142.06 |
| 6,287,201 B1 * | 9/2001 | Hightower | 463/41 |
| 6,377,685 B1 * | 4/2002 | Krishnan | 379/368 |
| 6,393,461 B1 * | 5/2002 | Okada et al. | 709/204 |
| 6,508,710 B1 * | 1/2003 | Paravia et al. | 463/42 |
| 6,682,427 B1 * | 1/2004 | Wolinsky | 463/41 |

* cited by examiner

LOGIC FOR DISPLAYING PLAYER IDs AT EACH PLAYER'S TERMINAL

IN TERMINAL PLACING OUTGOING CALL

IN TERMINAL RECEIVING INCOMING CALL

| GAME MODE OFF |

| PLAYER 1 | |
|---|---|
| PLAYER 2 | |

| 1 | 2 ABC | 3 DEF |
|---|---|---|
| 4 GHI | 5 JKL | 6 MNO |
| 7 PRS | 8 TUV | 9 WXY |
| * | 0 OPER | # |

*FIG. 11*

METHOD AND APPARATUS FOR IDENTIFYING GAME PLAYERS AND GAME MOVES

REFERENCE TO RELATED PATENT APPLICATIONS

The following patent application is related:
U.S. patent application entitled, "METHOD AND APPARATUS FOR SIMULATING GAME ACCESSORIES", invented by Scott Wolinsky, Ser. No. 09/870,210, filed on May 30, 2001.

FIELD OF THE INVENTION

The present invention relates to the field of telecommunications as it relates to remote apparatus for enabling game players present at remote locations to play a game over a communications link.

DESCRIPTION OF THE RELATED ART

There are numerous known remote game systems in which players, present at various remote locations, can play a game by communicating coded information relating to the state of the game through a common communication network, such as a telephone line.

By way of a first example, in U.S. Pat. No. 4,372,558 entitled "Remote Gaming Apparatus" and issued to Shimamoto et al. on Feb. 8, 1983, each player has a dedicated game apparatus for detecting and displaying the position of game pieces (i.e., chess pieces). Each dedicated gaming apparatus has communications hardware for transmitting and receiving over the phone system coded information relating to the position of the game pieces. In this manner, each dedicated gaming apparatus displays the current position of the game pieces as effected by both players.

The apparatus disclosed by '558 patent does not identify the players or enable the players to communicate with each other while playing the game. Further, not only must each player input their game moves, but they must also manually move game pieces on a game board.

By way of a second example, U.S. Pat. No. 5,186,471 entitled "Interactive Telephone Gaming System" and issued to Vancraeynest on Feb. 16, 1993, discloses a gaming apparatus for use with a telephone network which supports standard dual tone multi-frequency (DTMF) signals. One or more players use a modified telephone station to play a game with a network gaming apparatus by receiving a sequence of DTMF tones and replicating the same sequence DTMF tones by pressing tone keys that correspond to the received sequence of DTMF tones. Each tone key has a corresponding light emitting diode (LED) which illuminates in response to receiving a corresponding DTMF signal from the network gaming apparatus. The illumination of the LEDs provide visible cues to the player at the modified telephone station to assist the player in matching the auditory pattern of DTMF tones generated by the network gaming apparatus.

The apparatus disclosed by the '471 patent does not identify players, nor does it enable play or communications between two or more players.

By way of a third example, U.S. Pat. No. 5,273,288 entitled "Communication Terminal Used As A Game Machine" and issued to Teshimna et al. on Dec. 28, 1993, discloses a communication terminal for playing a game with an opponent through a telephone line. The communication terminal comprises a push button type telephone connected parallel to the communication terminal so that a voice signal of the push button type telephone is simultaneously transmitted to the opponent with a PB signal and a position signal. Accordingly, it is possible to talk with an opponent during game play.

By way of a fourth example, U.S. Pat. No. 6,080,064 entitled "Device For Playing Games Via A Communications Network, And A Game System Using A Communications Network" and issued to Pieterse et al. on Jun. 27, 2000, discloses apparatus using a pointing device such as a joystick or the keys of a telephone set to generate DTMF pointing signals. Pieterse also discloses using the keys of a telephone set to transmit game instructions, such as "Fire", "Start", "Stop" and "Hold".

The apparatus disclosed by the '288 and '064 patents do not clearly identify and differentiate between players and their respective game moves, nor do they enable the display and identification of each player's moves on a modified keypad located at each of a plurality of communication terminals participating in game play.

Although known remote gaming systems succeed in providing entertainment to remotely located game players, they pose a problem in that they often require specialized apparatus, in addition to a telephone that shares a telephone line with the apparatus. Further, it is difficult to identify who made which move and whose turn it is, especially for a game played by a plurality of players.

Computer games, played via a server located in a telephone network or over the Internet, normally require the user to subscribe to a service and/or pay to play a game. For such games, it is difficult to set up a game with a known opponent. Often, game players are playing alone or against a computer. In other cases, players participating in game play do not know who their opponents are, and thus the personal interaction with friends and family members is lost. Further, such games do not allow parties having a conversation to spontaneously play a game by placing their communication devices in a game mode.

It is therefore an object of the present invention to incorporate a compact gaming system into a communication terminal, such that parties having a conversation can initiate game play without interfering with an ongoing conversation or having to connect additional equipment to their telephone lines.

It is a further object of the present invention to display at each terminal participating in a game, the identities of each player and to identify each player's game moves in a clear and compact manner.

SUMMARY OF THE INVENTION

In accordance with the principles of the present invention, the above and other objectives are realized in an apparatus and method for simultaneously indicating on each of a plurality of communication terminals, instructions transmitted by each terminal and the identity of the respective terminals that transmitted the instructions. Such a feature can be used to indicate the moves of parties playing a game over a telephone line. Once a party indicates a game move, the party is prohibited from making any additional moves until after the other party makes a move. The present invention can also be incorporated into wireless telephones (e.g., cellphones), walkie talkies, wireless toys and other types of transceivers.

More particularly, once a communications link (e.g., wired, wireless, etc.) is established between two or more parties, their terminals are placed in a game mode which activates inband signal detection circuitry located within the terminals. Multi-colored indicators (e.g., LEDs and/or LCDs) at each terminal are activated, their color being dependent upon the source of received instructions.

In a first embodiment of the invention to be described hereinafter, the telephone number of each player is displayed on a corresponding LCD. Additionally, one of a plurality of LEDs next to each LCD is illuminated in a color representing the player associated with the displayed telephone number. An LED blinking next to a particular player's displayed telephone number indicates that it is that player's turn to go.

In a second embodiment of the invention to be described hereinafter, player identification indicators may be incorporated into a touch tone keypad located on the terminals. The keypad's touch tone keys are modified such that each has two or more color coded LEDs incorporated within, each color representing a particular player's move. Thus, besides providing a means for dialing telephone numbers and transmitting DTMF tones, the touch tone keys can represent a game board and/or game accessory when the terminal is placed in a game mode. For example, a 3 by 3 matrix formed by touch tone keys numbered 1 through 9 on a touch-tone pad of a communication terminal may be modified to contain two different colored indicators which light up in accordance with a particular party's move. The 3 by 3 matrix can be used to play tic-tac-toe over a telephone line. The activation of three LEDs of the same color in a row, column or diagonal will cause those LEDs to blink on each terminal, signifying the end of the game. Of course, the game tic-tac-toe is an elementary game, and the invention could be used for numerous other games (e.g., battleship, checkers, chess, etc.) by expanding the functionality of the touch-tone pad. Also, the invention could be expanded to incorporate games played by more than two players.

In a third embodiment of the invention to be described hereinafter, the indicators are installed on a gaming board which is extended (e.g., a spring loaded gaming board) from the base of the terminal, or inserted into an auxiliary card slot on the terminal. The color of the indicators clearly identify which instructions were sent by each party.

In a fourth embodiment of the invention to be described hereinafter, the indicators may be incorporated into a keypad consisting of one or more liquid crystal displays (LCDs) or a touch panel which normally displays the symbols of a touch tone telephone and, when a game mode is activated, the symbols change to game status indicators (e.g., game pieces).

BRIEF DESCRIPTION OF THE DRAWINGS

FIG. 11 illustrates a keypad configuration comprising a plurality of LCDs, wherein numbers corresponding to each key on the keypad numbered 1 through 9 are displayed prior to activation of the game mode in accordance with the present invention.

DETAILED DESCRIPTION OF THE INVENTION

The present invention is an apparatus and method for simultaneously indicating on each of a plurality of communication terminals, game move selections transmitted by each terminal and the identity of the respective terminals and/or players that transmitted the game move selections. Further, the present invention tracks and indicates whose turn it is to input a game move selection. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
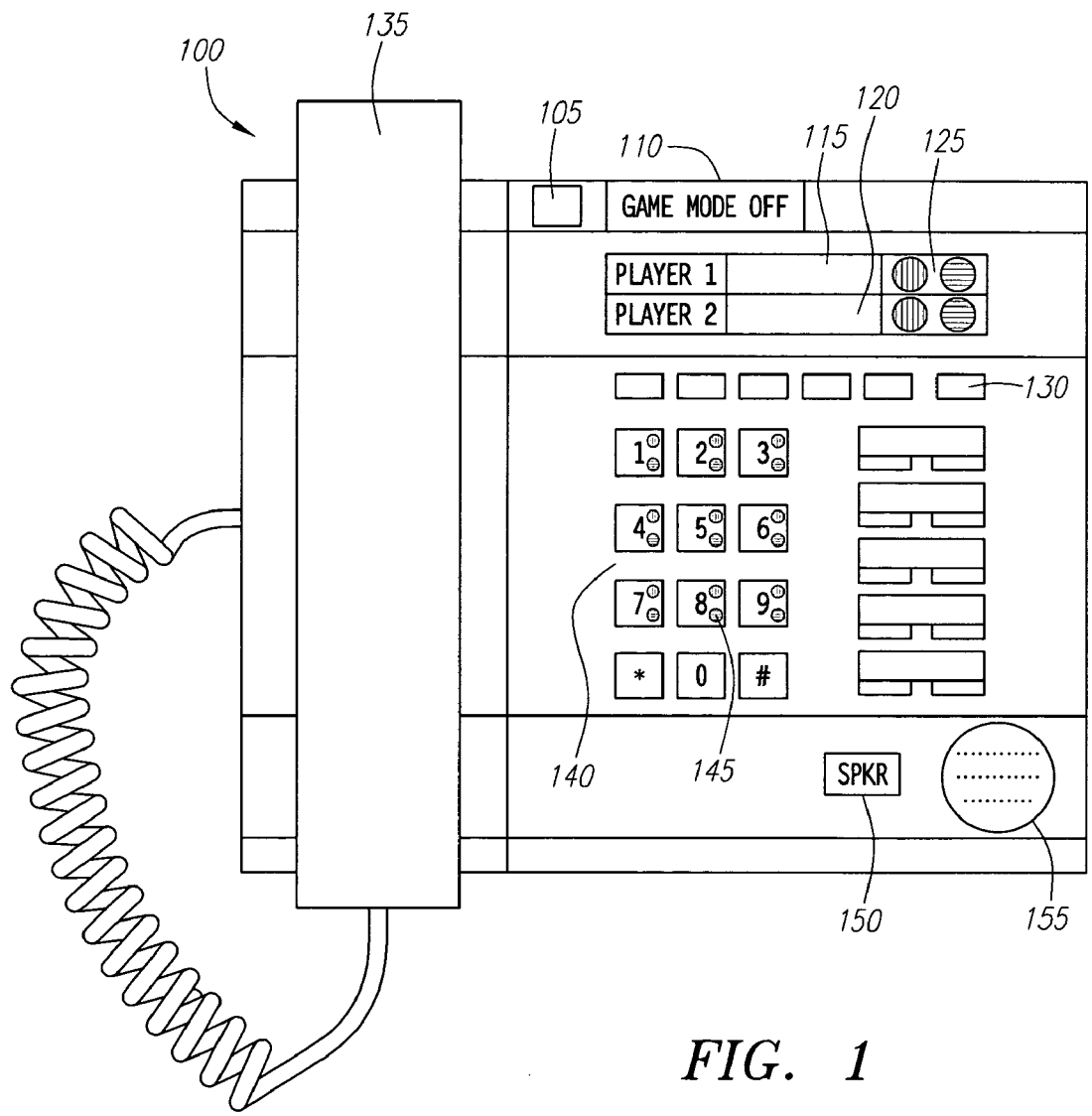
FIG. 1 illustrates a speakerphone terminal with its game mode deactivated in accordance with the present invention.

Referring now to FIG. 1, a speakerphone terminal 100 with its game mode deactivated in accordance with the present invention is illustrated. Speakerphone terminal 100 includes a handset 135, an external speaker activator 150 and an external speaker 155, such that a user can carry out a conversation with another party without having to hold handset 135. Speakerphone terminal 100 is capable of placing telephone calls by using keypad 140 to dial telephone numbers, and is also capable of receiving telephone calls in a manner known to one of ordinary skill in the art. Once a communications link with another party has been established, the user of speakerphone terminal 100 can activate a game mode at any time. In accordance with the present invention, speakerphone terminal 100 comprises a game mode activator 105 and game mode state display 110, which are shown in a deactivated (off) state. Further, speakerphone terminal 100 includes player identification displays 115 and 120, and game player key identifier 125. The player identification displays 115 and 120 comprise LCDs. The game player key identifier 125 comprises a plurality of color coded LEDs. When speakerphone terminal 100 is first installed at a particular location, the telephone number to be associated with speakerphone terminal 100 is permanently stored in memory by the user until the number is changed (e.g., due to relocation). Memory storage key 130 is activated to enable storage of the terminal's telephone number. Some or all of the keys in keypad 140 contain game move indicators 145 consisting of a plurality of color coded LEDs. When the game mode is off, displays 115 and 120 are deactivated, as well as the game player key identifiers 125 and all game move indicators. The game playing circuitry of the present invention may be powered by a battery within speakerphone terminal 100, an external power source (e.g., AC power), or powered from the telephone line. Because not all established calls will be for the purpose of playing games, the game mode feature has been incorporated as a way of conserving power.

Figure 2:
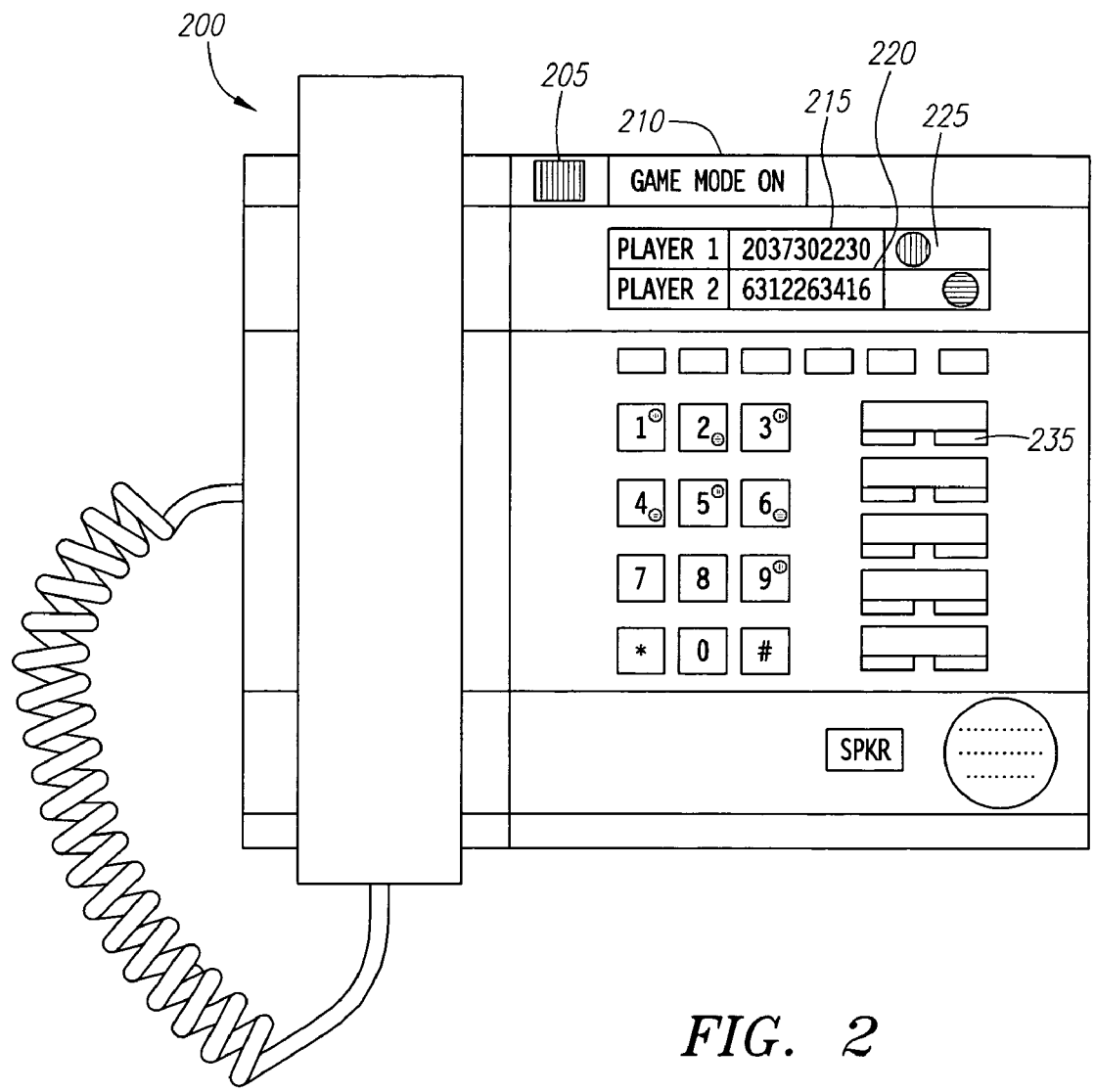
FIG. 2 illustrates a speakerphone terminal with its game mode activated in accordance with the present invention.

Referring now to FIG. 2, a speakerphone terminal 200 with its game mode activated in accordance with the present invention is illustrated. Speakerphone terminal 200 comprises a game mode activator 205 and game mode state display 210, which are shown in an activated (on) state. Speakerphone terminal 200 includes player identification displays 215 and 220 which contain game player telephone numbers and game player key identifier 225. After a communications link with another terminal is established, the user of speakerphone terminal 200 depresses game mode activator 205. Assuming that the other party of the communications link has similar gaming apparatus, the game mode of the other party's terminal may be activated in response to an inband signal transmitted in response to depressing activator 205, or both player's may both activate their game modes. One player is identified as "Player 1", telephone number 2037302230 and assigned a first color (e.g., red) by game player key identifier 225. The other player is identified as "Player 2", telephone number 6312263416 and assigned a second color (e.g., blue). Telephone numbers could be automatically translated into player names by scanning a translation database, if such a feature was desired by a designer of the terminal. As an optional embodiment, one or more special feature buttons 235 can be depressed to change (swap) player, color identifiers and to override player move authorizations regarding which player goes first. Once the game mode is activated, one of the player's is authorized to make the first game move as indicated by which colored LED of the game player key identifier 225 is sequentially turning on and off (e.g., blinking). The authorized player then inputs a game move by depressing one or more keys on the player's terminal keypad. As shown, the results of a completed game of tic-tac-toe are displayed on each terminal user's keypad. Note that player 1 won because keys 1, 5 and 9 were selected, thus completing a diagonal on a three by three matrix (keypad keys 1 through 9). The winner may be indicated by causing the three illuminated LEDs on the diagonal to blink on and off.

Figure 3:
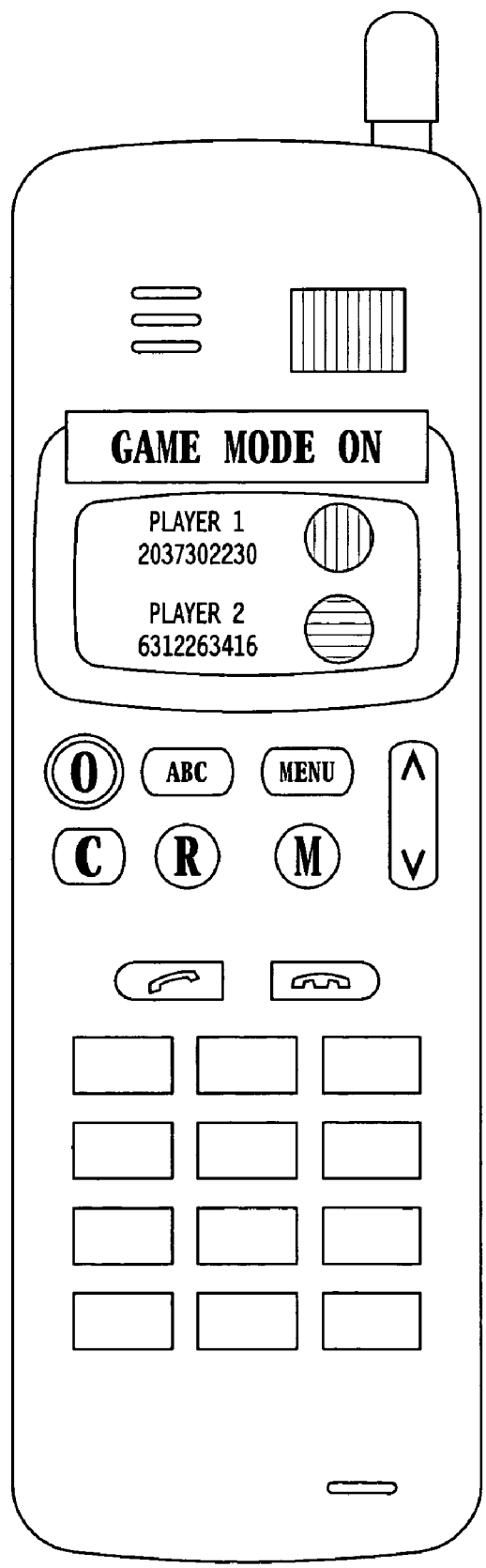
FIG. 3 illustrates a wireless terminal with its game mode activated in accordance with the present invention.

Referring now to FIG. 3, a cellular (wireless) telephone is illustrated in accordance with the present invention. In this configuration, the identities of the players, their associated telephone numbers and their assigned colors are conveyed on a single display.

Figure 4:
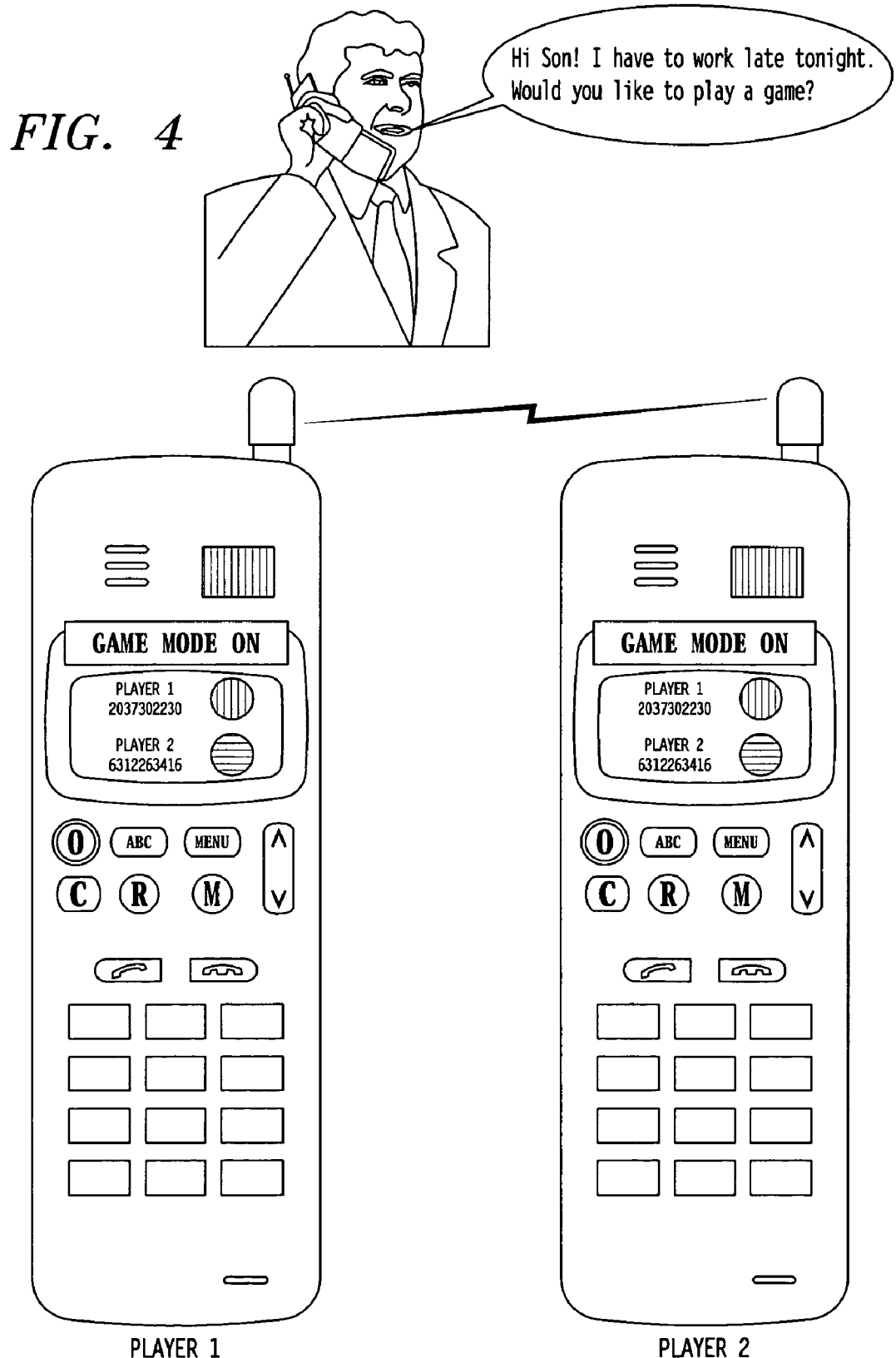
FIG. 4 illustrates use of a plurality of wireless terminals for spontaneous game playing during an ongoing conversation in accordance with the present invention.

Referring now to FIG. 4, wireless communication between two players is illustrated in accordance with the invention. The features afford compact and portable game playing features. For example, Scott calls his 10 year old son Bobby and informs Bobby that he will have to work late. Both Scott and Bobby are equipped with a wireless communication terminal in accordance with the present invention. During their conversation, Scott asks Bobby, "would you like to play a game of tic-tac-toe?" Bobby agrees. Scott and/or Bobby energize a "game mode" button on their devices. Before doing so, the devices performed as standard cellphones. Upon activating the game mode, an LCD displays the telephone numbers of Scott (player 1) and Bobby (player 2) and assigns colors (identifiers) used to differentiate between each player (e.g., red for Scott and blue for Bobby). The flashing of a red colored LED next to Scott's telephone number on each device indicates that it is Scott's turn to go first. Scott enters a game move by depressing one or more push buttons on his terminal. Thus he conveys one or more instructions to both terminals. The instructions are processed in each of Scott's and Bobby's devices by pre-programmed microprocessors (e.g., CPUs) which control all functions of each terminal's game mode. Scott and Bobby continue playing the game by taking turns inputting game moves (instructions) until the game ends.

Figure 5A:
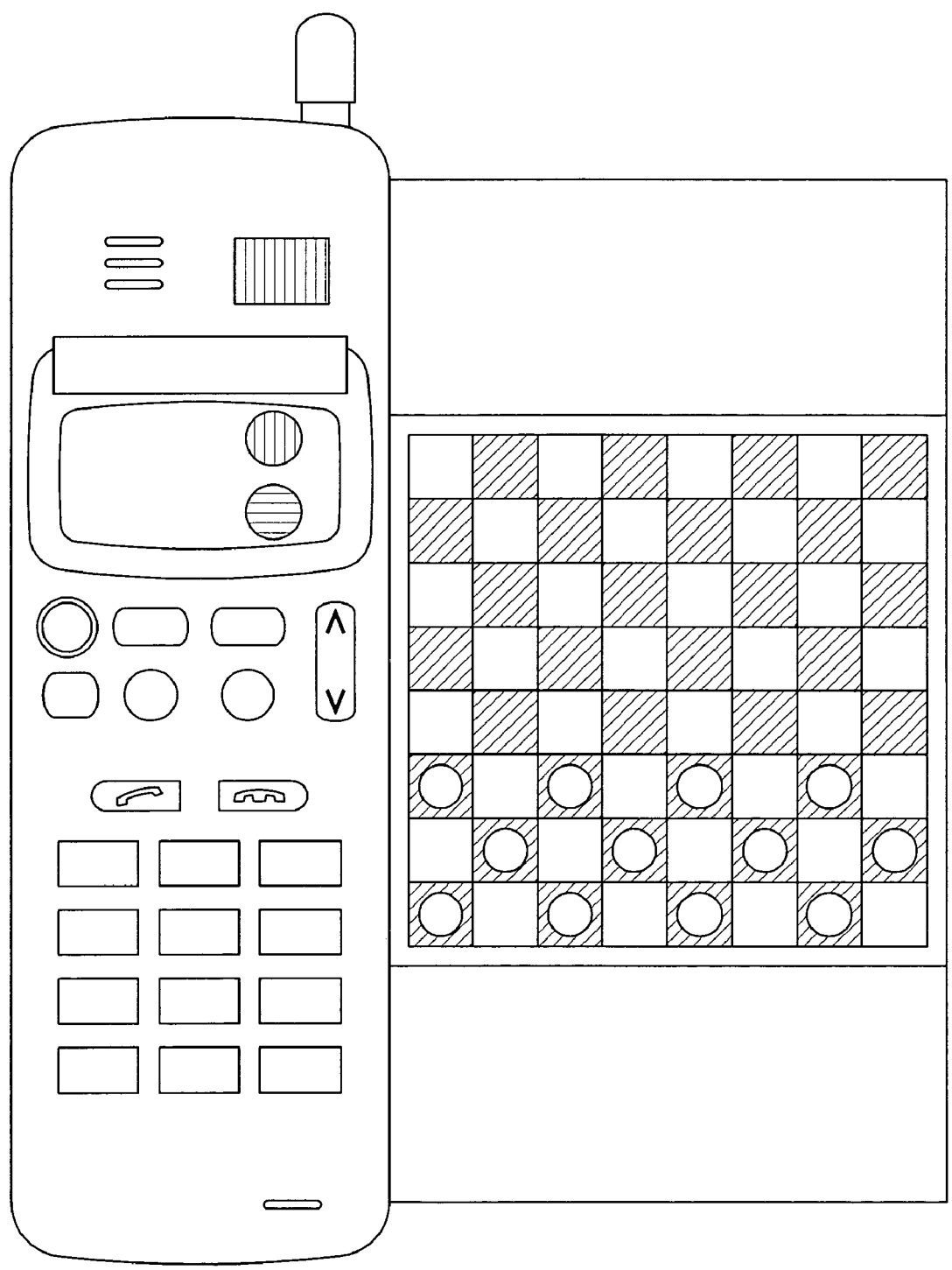
FIGS. 5A and 5B illustrate auxiliary game cards/modules inserted into an auxiliary card slot of a wireless terminal in accordance with the present invention.
Figure 5B:
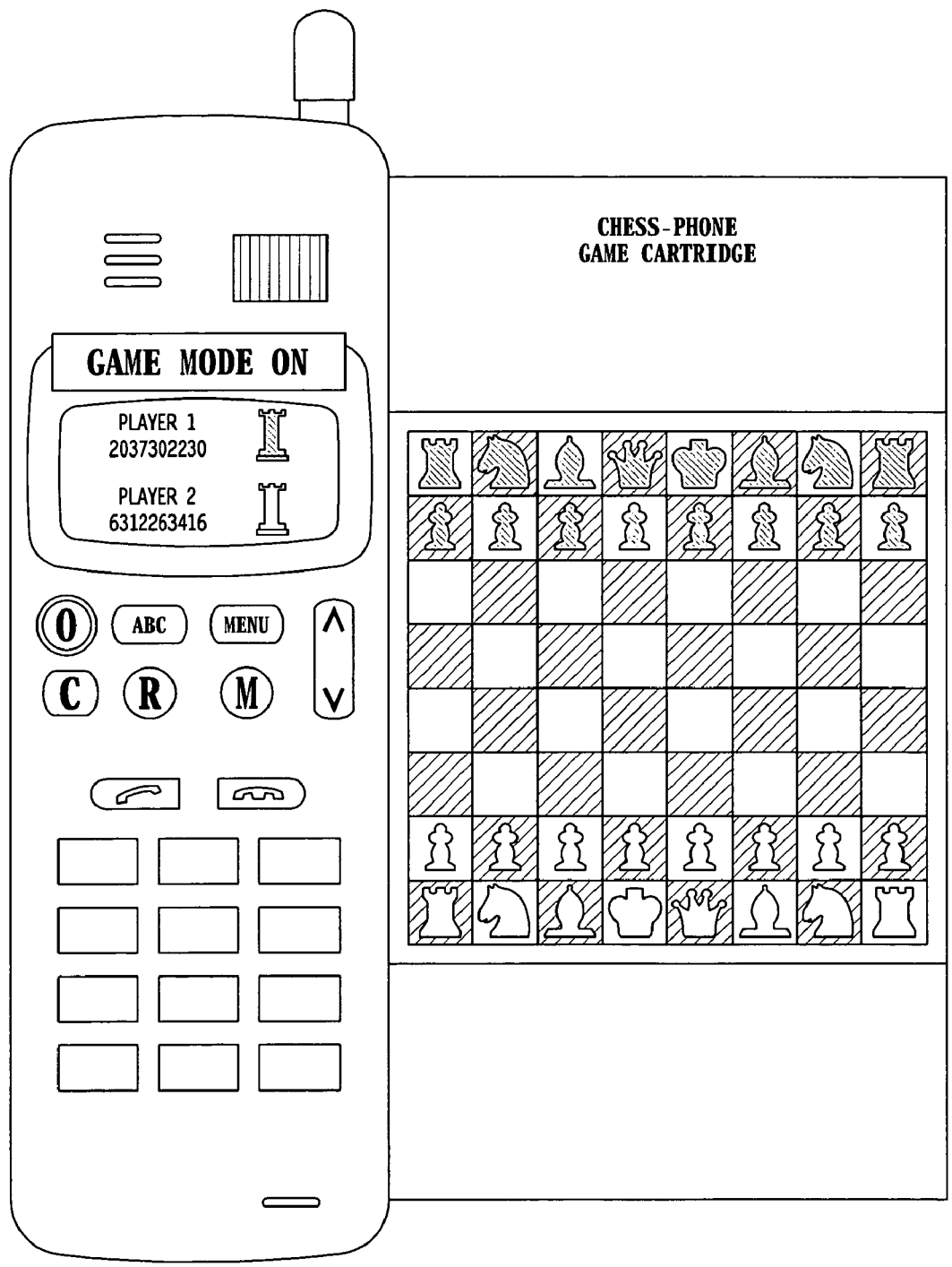

Referring now to FIGS. 5A and 5B, auxiliary game cards/modules can be inserted into a wireless communication terminal in accordance with the present invention. Auxiliary game cards provide additional software, features and functions that go beyond the capabilities of the base communication terminal.

Figure 6:
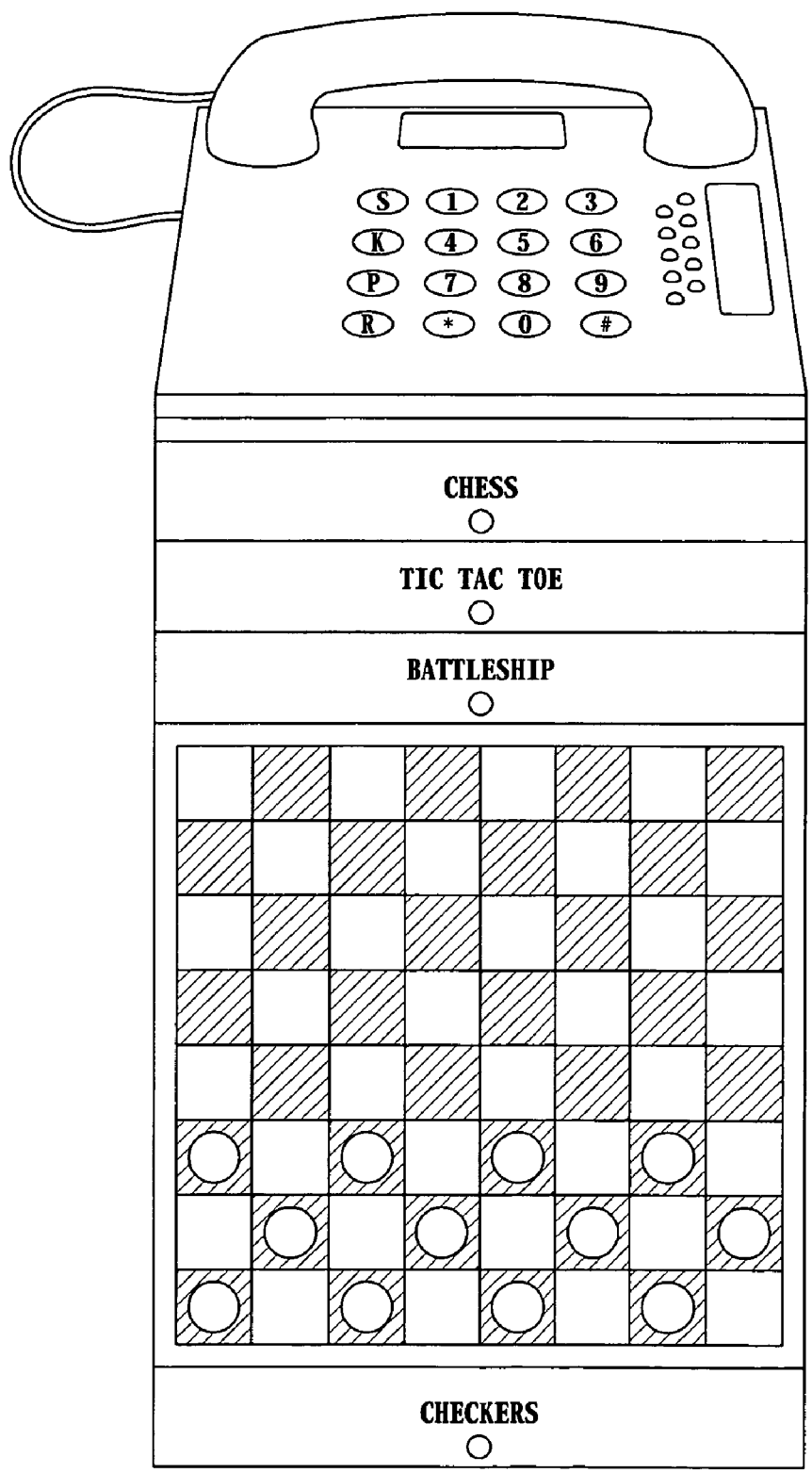
FIG. 6 illustrates a terminal comprising a plurality of digital gaming boards, one being extended for play in accordance with the present invention.

Referring now to FIG. 6, a terminal containing multiple game boards inserted into its base is illustrated in accordance with the present invention. The game boards can be pulled out as desired, or they can be spring loaded and pop out when a button on the game is depressed. Ribbon cable can be used to connect the circuitry from the individual game boards to the terminal. Each of these game boards provide specialized software and functions to play a particular game.

Figure 7:
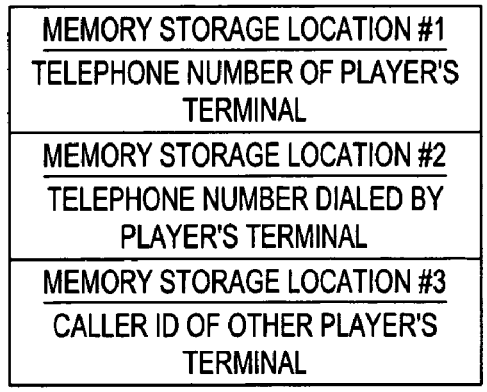
FIG. 7 illustrates logic used for displaying game player IDs at each player's terminal in accordance with the present invention.
Figure 7:
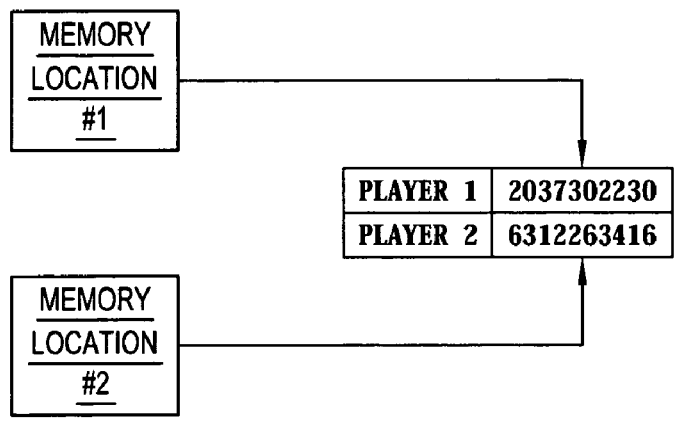
Figure 7:
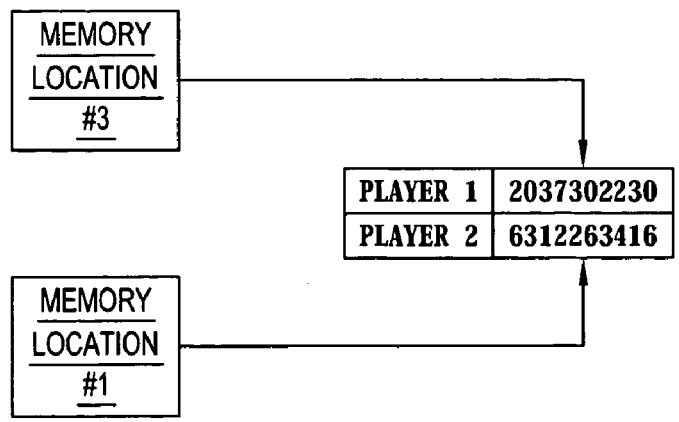

Referring now to FIG. 7, the logic for displaying player IDs at each player's terminal is illustrated. Each terminal contains three memory locations dedicated to storing the telephone number of the user's terminal (memory storage location #1), the dialed telephone number (memory storage location #2) and the caller ID of another player's terminal (memory storage location #3). If a player originates a communications link to another player (placed an outgoing call), the telephone numbers in memory storage locations #1 and #2 are promptly displayed on each terminal once a game mode is activated. If a player receives a call, the telephone numbers in memory storage locations #1 and #3 are promptly displayed on each terminal once a game mode is activated.

Figure 8A:
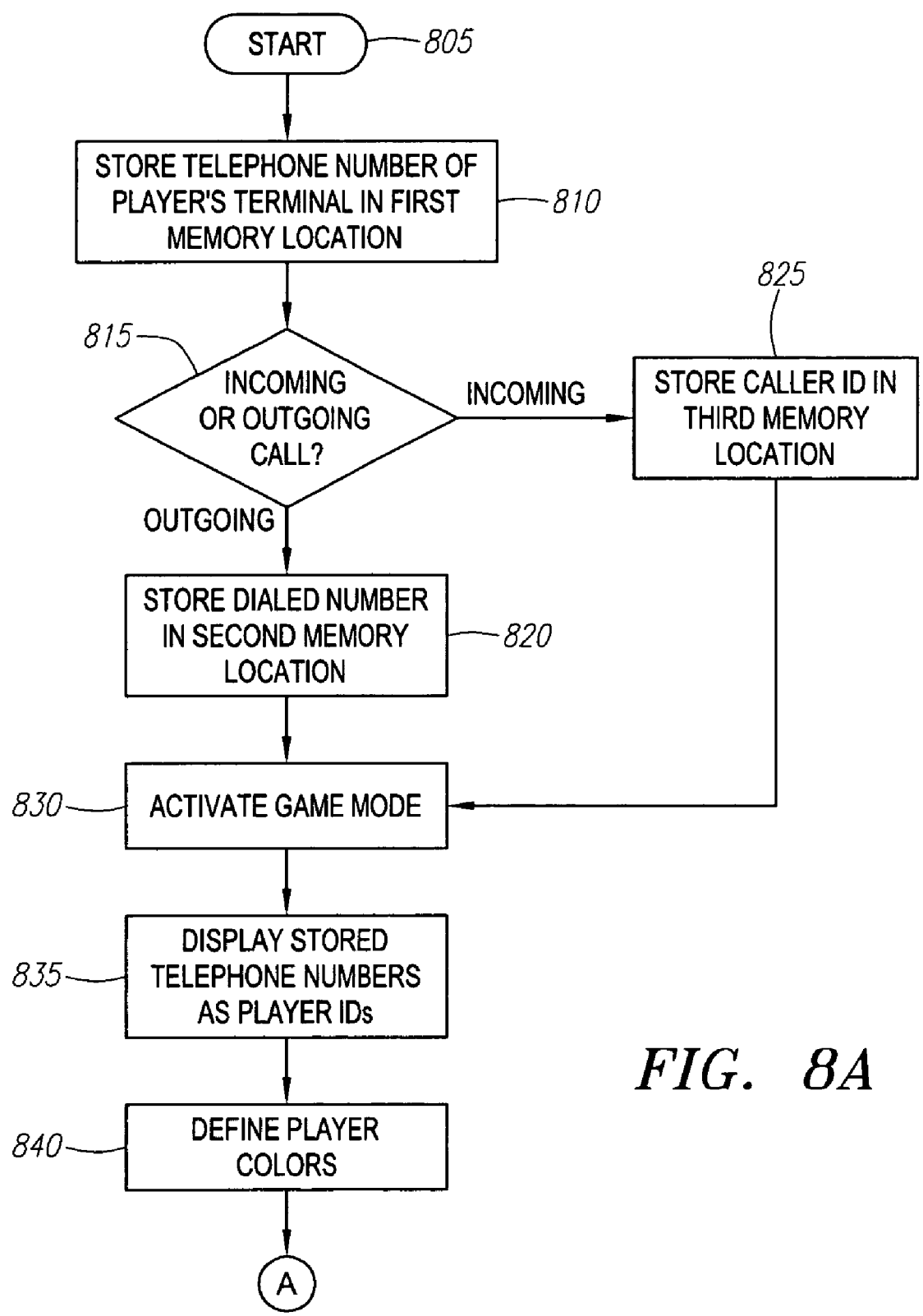
FIGS. 8A and 8B illustrate a method flow chart in accordance with the present invention.

Referring now to FIG. 8A, a flow chart of a method implemented by the present invention is illustrated. The method is initiated at step 805. When a terminal incorporating the features of the present invention is first used, the user is instructed to store the terminal's telephone number in a first memory location within the terminal (step 810). As long as the terminal's telephone number remains unchanged, the first memory location retains the telephone number. The terminal operates as a complete communications device, whether it be a cellular phone, a speakerphone, a telephone or a computer. When a communication is established over a common communications link (wired or wireless) with another terminal, a determination is made as to whether the terminal initiated the communication (e.g., such as by placing an outgoing telephone call) or received the communication (such as by receiving an incoming telephone call) (step 815). If it is determined that the communication was initiated by the terminal, the address used to initiate the communication (e.g., dialed number) is stored in a second memory location (step 820). If it is determined that the communication was initiated by a different terminal, the address of the different terminal is determined (e.g., such as by using caller ID or manually inputting identifying information) and stored in a third memory location (step 825). Other terminals connected to the communications link do not need to incorporate the features of the present invention in order to carry out communication between the terminals.

However, if the terminals incorporate the features of the present invention, the users of the terminals may spontaneously decide to play a game at any time during an ongoing conversation by having one or more of the users activate a "Game Mode" option on their terminals (step 830). Upon such activation, the addresses of terminals communicating over the communications link are promptly displayed on each terminal (step 835). The terminals may be programmed to always designate the original calling (initiating) party as "Player 1" and designate the called (receiving) party as "Player 2". Identifiers are then defined for each terminal by assigning a color to represent their upcoming game move selections, and to differentiate between the different players' moves (step 840).

Figure 8B:
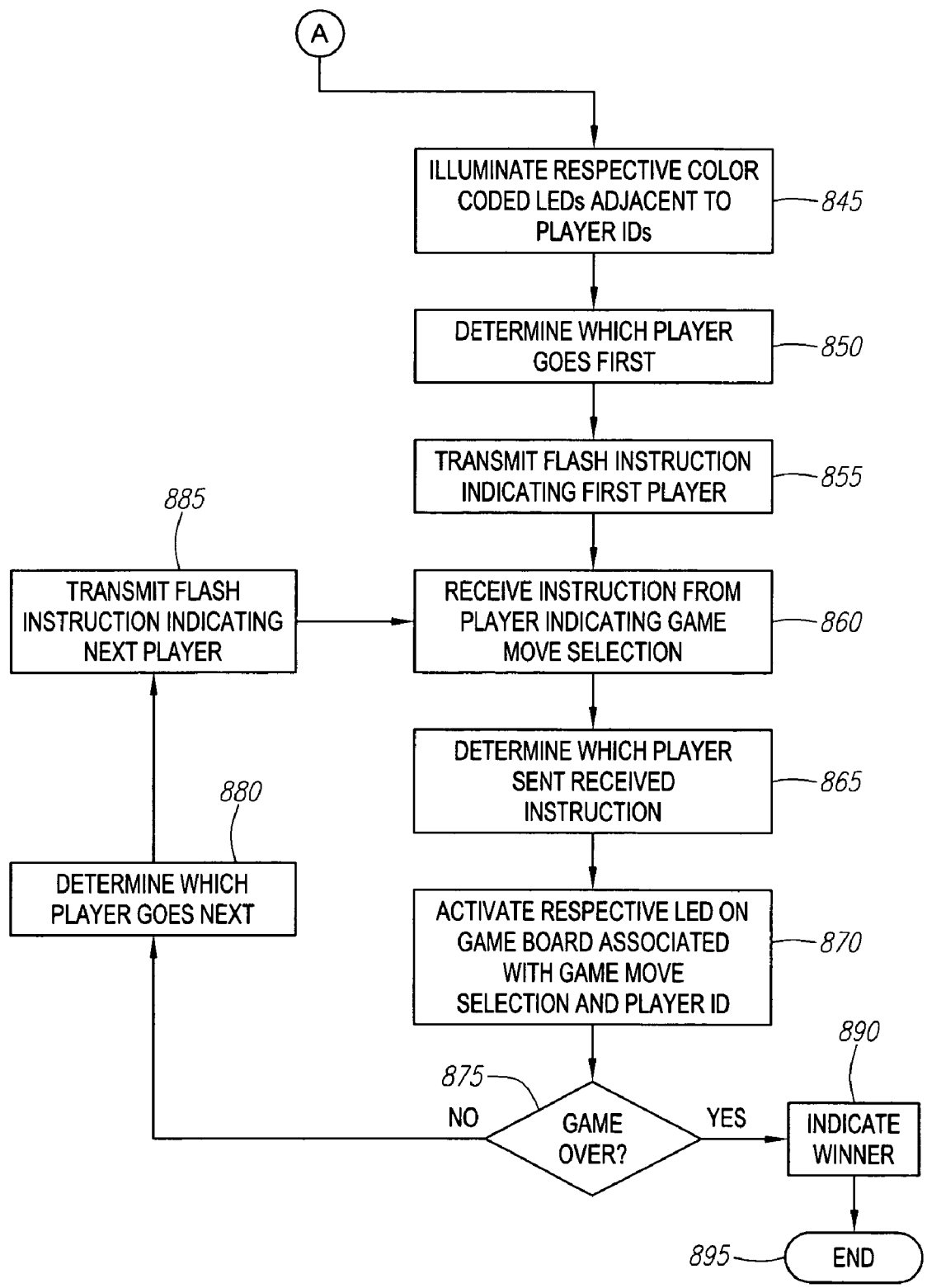

Referring now to FIG. 8B, a colored LED is illuminated next to Player 1's telephone number, and a second colored LED is illuminated next to Player 2's telephone number on each player's terminal (step 845). A determination is then made as to which player goes first (step 850). Such a determination can be based upon which player placed the call (Player 1 would go first), or by providing an input means for selecting which player goes first. Upon determining which player goes first, one of the illuminated LEDs (player identifiers) on each terminal flashes next to the Player's ID in response to a "turn flash" instruction (step 855). It would then be Player 1's turn to input a game move selection on his or her terminal. Upon Player 1's input, an instruction indicating a game move selection is received at both terminals (step 860). Upon receipt of the instruction, the flashing LED ceases to flash and a determination is made as to which terminal sent the instruction (step 865). Then Player 1's move is represented by illuminating a color coded LED corresponding to the move on a game board incorporated at each player's terminal (step 870). A determination is then made as to whether the game is over (e.g., did a player win?) (step 875). If it is determined that the game is not over, a determination is made as to which player is to make the next move (step 880). Upon such determination, again one of the illuminated LEDs on each terminal flashes next to the next Player's ID in response to another "turn flash" instruction (back to step 885). The game proceeds in such a fashion until it is determined that the game is over (step 875). An indication of the winner is conveyed on both terminals (step 890). The game then ends (step 895).

Figure 9:
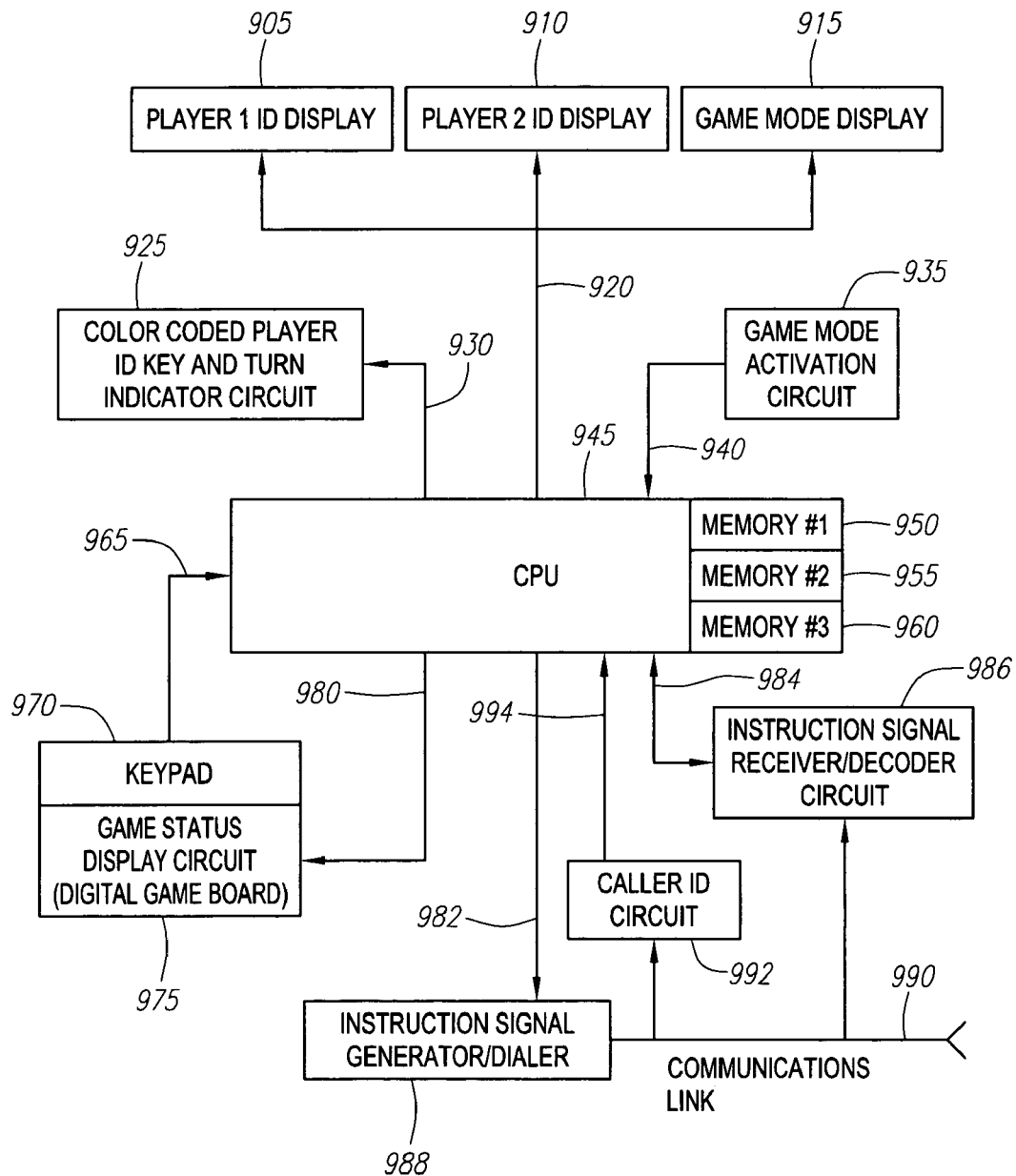
FIG. 9 discloses a block diagram of terminal circuitry used in accordance with the present invention.

FIG. 9 illustrates terminal circuitry used to implement the present invention. Upon initial use of the terminal, the user is instructed to input the terminal's address (e.g., telephone number) on keypad 970. Via path 965, the address is received by CPU 945 and permanently stored in a first memory location 950. When a communication is initiated by the user, the user inputs a called terminal's address on keypad 970. Via path 965, the address is received by CPU 945 and temporarily stored in a second memory location 955. The call is placed by instruction signal generator/dialer circuit 988 which receives dialing instructions from CPU 945 via path 982. A communication is then established over common communications link 990 with another terminal. When a communication is received from a different terminal via communications link 990, the address of the other terminal is processed by caller ID circuit 992, forwarded to CPU 945 via path 994 and temporarily stored in third memory location 960. During an ongoing conversation, one of the users may activate a "Game Mode" option on their terminals which causes game mode activation circuit 935 to instruct CPU 965 via path 940 to activate Player 1 and Player 2 ID displays 905 and 910 via path 920, and to change game mode display 915 to visually indicate that the game mode is activated. Upon such activation, the addresses of terminals communicating over the communications link are retrieved from memories 950, 955 and/or 960 and are promptly displayed. Additionally, color coded player ID key and turn indicator circuit 925 is activated by CPU 945 via path 930, which illuminates a first colored LED next to Player 1's address and a second colored LED next to Player 2's address on each player's terminal. One of the illuminated LEDs (player identifiers) on each terminal flashes next to the Player's ID in response to a "turn flash" instruction generated by CPU 945. All game move signals received from another terminal are received over communications link 990 and are processed by instruction signal receiver/decoder circuit 986 and forwarded to CPU 945 via path 984. The CPU 945 keeps track of whether the terminal within which the CPU 945 resides sent a game move, or whether an external terminal sent a game move. The instruction signal receiver/decoder circuit is controlled by CPU 945 such that it only processes signals received from outside the terminal. CPU outputs game moves via path 980 to game status display circuit 975, and to keypad 970 if the game moves are to be displayed on the keys of keypad 970.

Figure 10:
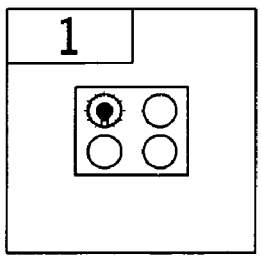
FIG. 10 illustrates a keypad configuration used to select and display game moves by illuminating multiple color coded LEDs located within keys of the keypad in accordance with the present invention.
Figure 10:
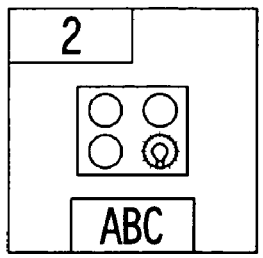
Figure 10:
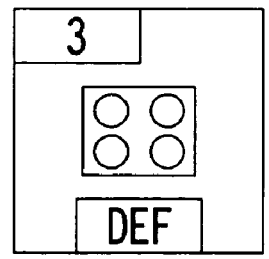
Figure 10:
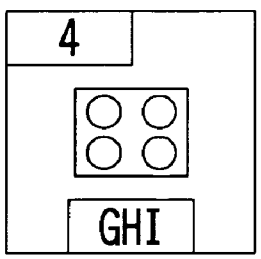
Figure 10:
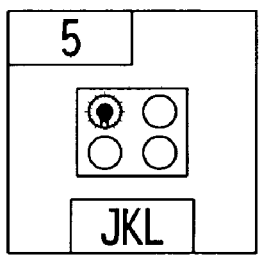
Figure 10:
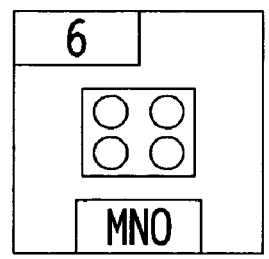
Figure 10:
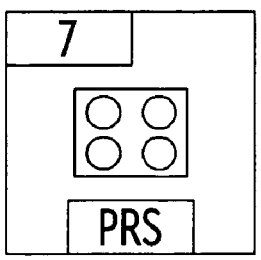
Figure 10:
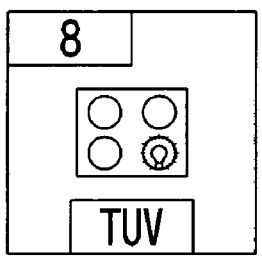
Figure 10:
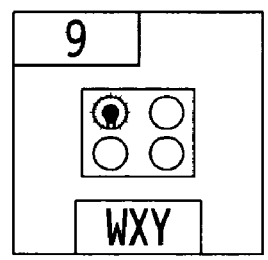
Figure 10:
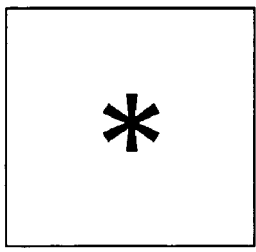
Figure 10:
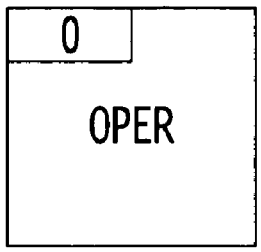
Figure 10:
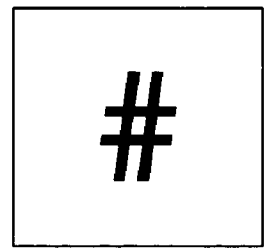

Referring to FIG. 10, a keypad layout in accordance with the present invention is illustrated. Each key position numbered 1 through 9 can contain up to four different colored LEDs. Only one LED in each key can be illuminated at a time.

Referring to FIG. 11, another embodiment of a keypad layout in accordance with the present invention is illustrated. Each key position numbered 1 through 9 can contain an LCD which displays the number of the key when the game mode is off.

Figure 12:
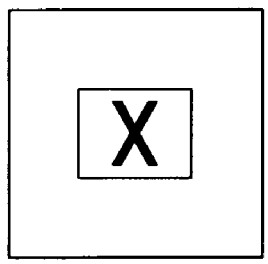
FIG. 12 illustrates a keypad configuration comprising a plurality of LCDs, wherein game moves corresponding to each key on the keypad are displayed during a game initiated after the activation of the game mode in accordance with the present invention.
Figure 12:
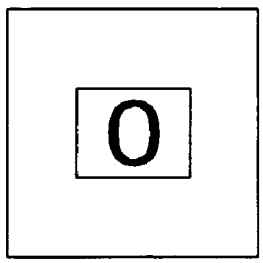
Figure 12:
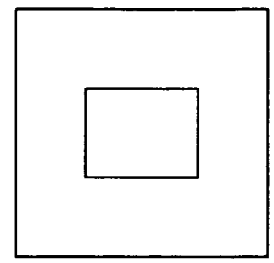
Figure 12:
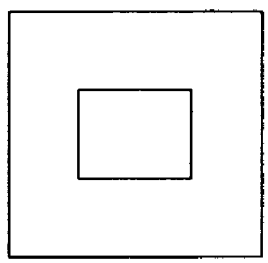
Figure 12:
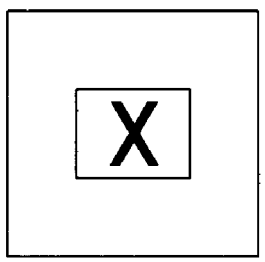
Figure 12:
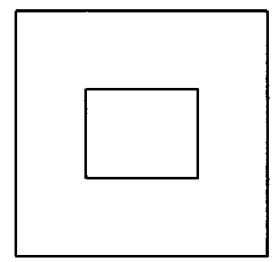
Figure 12:
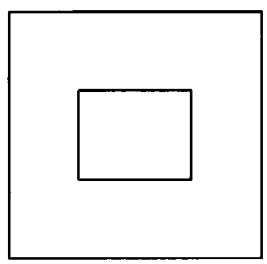
Figure 12:
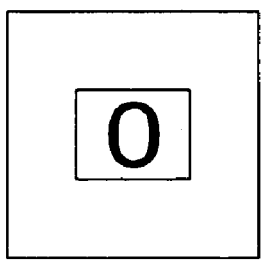
Figure 12:
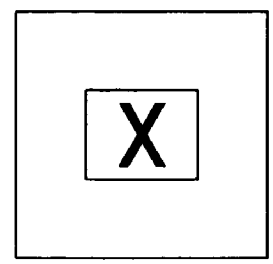
Figure 12:
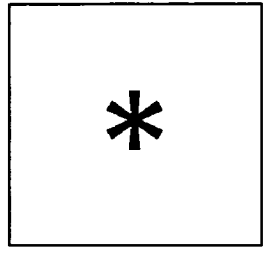
Figure 12:
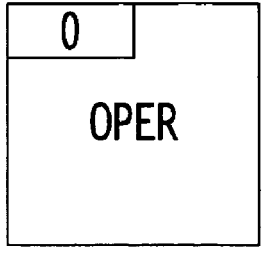
Figure 12:
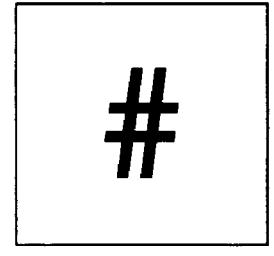

Referring to FIG. 12, the key displays shown in FIG. 11 go blank when the game mode is activated, and as a game progresses, game pieces are displayed on the keys. In the case of tic-tac-toe, X's and O's are displayed in accordance with the players inputs.

It should be noted that the method and apparatus described herein has been illustrated as supporting communications and game play between only two game players. However, it is understood that the invention can be dimensioned to concurrently support more than two players.

An apparatus and method for simultaneously indicating on each of a plurality of communication terminals, instructions transmitted by each terminal and the identity of the respective terminals that transmitted the instructions is described herein. These specific arrangements and methods described herein are merely illustrative of the principles of the present invention. Numerous modifications in form and detail may be made by those of ordinary skill in the art without departing from the spirit and scope of the present invention. Although this invention has been shown in relation to a particular embodiment, it should not be considered so limited. Rather, the present invention is limited only by the scope of the appended claims.

What is claimed is:

1. A method of identifying game players and game moves, comprising:

in a first communication terminal having a first and a second memory location, storing a telephone number of said first communication terminal in said first memory location;

in a second communication terminal having a third memory location and a fourth memory location, storing a telephone number of said second communication terminal in said third memory location;

dialing at said first communication terminal, a telephone number of said second communication terminal;
storing said dialed telephone number in said second memory location;
establishing a communications link between said first and second communication terminals;
determining, at said second communication terminal, the telephone number of said first communication terminal;
storing said telephone number of said first communication terminal in said fourth memory location;
displaying at each of said terminals, said telephone number of said first terminal retrieved from said first and fourth memory locations;
displaying at each of said terminals, said dialed telephone number retrieved from said second and third memory locations while said telephone number of said first terminal is being displayed;
activating at each of said communication terminals, a game mode to play a game between a first player associated with said first communication terminal and a second player associated with said second terminal;
defining a plurality of identifiers used to differentiate between said first and second players;
activating a first indicator representing said first player;
activating a second indicator representing said second player;
indicating at each of said communication terminals, which player is currently authorized to send a game move instruction;
receiving said move instruction from said authorized player; and
displaying at each of said communication terminals, a game move and identifier associated with said received move instruction.

2. The method of claim 1, wherein said game move and identifier are displayed on one or more keys of a keypad used to dial said dialed telephone number.

3. The method of claim 1, wherein the step of receiving said move instruction from said authorized player comprises receiving from said authorized player at least one dual tone multi-frequency (DTMF) signal.

4. The method of claim 1, wherein the step of indicating at each of said communication terminals comprises sequentially activating and deactivating one of said first and second indicators at each of said communication terminals.

5. The method of claim 1, wherein the steps of activating the first and second indicators comprises activating color coded light emitting diodes (LEDs).

6. A method of identifying game players and game moves, comprising:
in a first communication terminal having a first and a second memory location, storing a telephone number of said first communication terminal in said first memory location;
in a second communication terminal having a third memory location and a fourth memory location, storing a telephone number of said second communication terminal in said third memory location;
receiving at said second communication terminal, a telephone number of said first communication terminal;
storing said received telephone number in said fourth memory location;
establishing a communications link between said first and second communication terminals;
storing a telephone number of said second communication terminal in said second memory location;
activating at each of said communication terminals, a game mode to play a game between a first player associated with said first communication terminal and a second player associated with said second communication terminal;
displaying at each of said communication terminals, said received telephone number; displaying at each of said communication terminals, said telephone number of said second communication terminal while said received telephone number is being displayed;
defining a plurality of identifiers used to differentiate between said first and second players;
activating a first indicator representing said first player;
activating a second indicator representing said second player;
indicating at each of said communication terminals, which player is currently authorized to send a game move instruction;
receiving said move instruction from said authorized player; and
displaying at each of said communication terminals, a game move and identifier associated with said received move instruction.

7. The method of claim 6, wherein said game move and identifier are displayed on one or more keys of a keypad used to dial telephone numbers.

8. The method of claim 6, wherein the step of receiving said move instruction from said authorized player comprises receiving from said authorized player at least one dual tone multi-frequency (DTMF) signal.

9. The method of claim 6, wherein the step of indicating at each of said communication terminals comprises sequentially activating and deactivating one of said first and second indicators at each of said communication terminals.

10. The method of claim 6, wherein the steps of activating the first and second indicators comprises activating color coded light emitting diodes (LEDs).

11. Apparatus for identifying game players and game moves, comprising:
a first communication terminal having a first and a second memory location, wherein said first memory location stores a telephone number of the first communication terminal;
a second communication terminal having a third and a fourth memory location, wherein said third memory location stores a telephone number of the second communication terminal;
means for dialing, at the first communication terminal, a telephone number of the second communication terminal;
means for storing said dialed telephone number in said second memory location;
means for establishing a communications link between said first and second communication terminals;
means for storing said telephone number of said first communication terminal in said fourth memory location;
means for activating at each of said communication terminals, a game mode to play a game between a first player associated with said first communication terminal and a second player associated with said second communication terminal;
means for displaying at each of said communication terminals, said telephone number of said first communication terminal;

means for displaying at each of said communication terminals, said dialed telephone number while said telephone number of said first communication terminal is being displayed;

means for defining a plurality of identifiers used to differentiate between said first and second players;

means for activating a first indicator representing said first player;

means for activating a second indicator representing said second player;

means for indicating at each of said communication terminals, which player is currently authorized to send a game move instruction;

means for receiving said move instruction from said authorized player; and means for displaying at each of said communication terminals, a game move and identifier associated with said received move instruction.

12. The apparatus of claim 11, wherein said game move and identifier are displayed on one or more keys of a keypad used to dial said dialed telephone number.

13. The apparatus of claim 11, wherein said received move instruction comprises at least one dual tone multi-frequency (DTMF) signal.

14. The apparatus of claim 11, wherein said authorized player is indicated by sequentially activating and deactivating one of said first and second indicators at each of said communication terminals.

15. The apparatus of claim 11, wherein said first and second indicators comprise color coded light emitting diodes (LEDs).

16. Apparatus for identifying game players and game moves, comprising:

a first communication terminal having a first and a second memory location, wherein said first memory location stores a telephone number of the first communication terminal;

a second communication terminal having a third and a fourth memory location, wherein said third memory location stores a telephone number of the second communication terminal;

means for receiving, at the second communication terminal, a telephone number of said first communication terminal;

means for storing said received telephone number in said fourth memory location;

means for establishing a communications link between said first and second communication terminals;

means for storing a telephone number of said second communication terminal in said second memory location;

means for activating at each of said communication terminals, a game mode to play a game between a first player associated with said first communication terminal and a second player associated with said second communication terminal;

means for displaying at each of said communication terminals, said received telephone number;

means for displaying at each of said communication terminals, said telephone number of said second communication terminal while said received telephone number is being displayed;

means for defining a plurality of identifiers used to differentiate between said first and second players;

means for activating a first indicator representing said first player;

means for activating a second indicator representing said second player;

means for indicating at each of said communication terminals, which player is currently authorized to send a game move instruction;

means for receiving said move instruction from said authorized player; and means for displaying at each of said communication terminals, a game move and identifier associated with said received move instruction.

17. The apparatus of claim 16, wherein said game move and identifier are displayed on one or more keys of a keypad used to dial telephone numbers.

18. The apparatus of claim 16, wherein said received move instruction comprises at least one dual tone multi-frequency (DTMF) signal.

19. The apparatus of claim 16, wherein said authorized player is indicated by sequentially activating and deactivating one of said first and second indicators at each of said communication terminals.

20. The apparatus of claim 16, wherein said first and second indicators comprise color coded light emitting diodes (LEDs).

21. A method of identifying game players and game moves, comprising:

in a first communication terminal having a first memory location and a second memory location, storing a telephone number of said first communication terminal in said first memory location;

in a second communication terminal having a third memory location and a fourth memory location, storing a telephone number of said second communication terminal in said third memory location;

storing the telephone number of said second communication terminal in said second memory location;

at said first communication terminal, dialing the telephone number of said second communication terminal to place a first telephone call to said second communication terminal;

receiving the first telephone call at said second communication terminal and establishing a communications link between said first and second communication terminals;

receiving caller ID signals associated with the first telephone call at said second communication terminal;

obtaining the telephone number of said first communication terminal from the caller ID signals received at said second communication terminal;

storing the telephone number of said first communication terminal obtained from the caller ID signals in said fourth memory location;

at said first communication terminal, retrieving said telephone number of said first communication terminal from said first memory location and displaying the telephone number of said first communication terminal retrieved from said first memory location;

at said first communication terminal, retrieving said telephone number of said second communication terminal from said second memory location and displaying the telephone number of said second communication terminal retrieved from said second memory location;

at said second communication terminal, retrieving said telephone number of said second communication terminal from said third memory location and displaying the telephone number of said second communication terminal retrieved from said third memory location;

at said second communication terminal, retrieving said telephone number of said first communication terminal from said fourth memory location and displaying the telephone number of said first communication terminal retrieved from said fourth memory location, wherein said telephone numbers of said first and second communication terminals are displayed concurrently at said first and second communication terminals at least for a first period of time;

activating, at each of said terminals, a game mode to play a game between a first player associated with said first communication terminal and a second player associated with said second communication terminal;

defining a plurality of identifiers used to differentiate between said first and second players;

activating a first indicator representing said first player;

activating a second indicator representing said second player;

determining, based on which player placed the first telephone call, whether the first player or the second player is authorized to send a first game move instruction;

indicating at each of said communication terminals, which player is currently authorized to send a game move instruction;

receiving said move instruction from the authorized player; and displaying at each of said terminals, a game move and identifier associated with the received move instruction.

22. The method of claim 21, further comprising enabling at least one of the first and second players to change which player is authorized to send the first game move instruction.

23. A method of identifying game players and game moves, comprising:

in a first communication terminal having a first memory location and a second memory location, storing a telephone number of said first communication terminal in said first memory location;

in a second communication terminal having a third memory location and a fourth memory location, storing a telephone number of said second communication terminal in said third memory location;

storing the telephone number of said second communication terminal in said second memory location;

at said first communication terminal, dialing the telephone number of said second communication terminal to place a first telephone call to said second communication terminal;

receiving the first telephone call at said second communication terminal and establishing a communications link between said first and second communication terminals;

storing the telephone number of said first communication terminal in said fourth memory location;

at said first communication terminal, retrieving said telephone number of said first communication terminal from said first memory location and displaying the telephone number of said first communication terminal retrieved from said first memory location;

at said first communication terminal, retrieving said telephone number of said second communication terminal from said second memory location and displaying the telephone number of said second communication terminal retrieved from said second memory location;

at said second communication terminal, retrieving said telephone number of said second communication terminal from said third memory location and displaying the telephone number of said second communication terminal retrieved from said third memory location;

at said second communication terminal, retrieving said telephone number of said first communication terminal from said fourth memory location and displaying the telephone number of said first communication terminal retrieved from said fourth memory location; and determining, based on which player placed the first telephone call, whether the first player or the second player is authorized to send a first game move instruction;

wherein said telephone numbers of said first and second communication terminals are displayed concurrently at said first and second communication terminals at least for a first period of time.

24. The method of claim 23, further comprising enabling at least one of the first and second players to change which player is authorized to send the first game move instruction.

25. Apparatus for identifying game players and game moves, comprising:

a first communication terminal comprising a first memory location, a second memory location, a dialer circuit, and a display, the first memory location being capable of storing a telephone number of the first communication terminal;

a second communication terminal having a third memory location, a fourth memory location, a display, and a caller ID circuit, the third memory location being capable of storing a telephone number of the second communication terminal, and the fourth memory location being capable of storing the telephone number of the first communication terminal received from the caller ID circuit;

wherein:

the dialer is capable of dialing the telephone number of the second communication terminal to establish a communications link between said first and second terminals;

the second memory location is capable of storing the telephone number of the second communication terminal;

the first and second communication terminals are capable of entering a game mode to play a game between a first player associated with said first communication terminal and a second player associated with said second communication terminal;

the display of the first communication terminal displays the telephone numbers of the first and second communication terminals at the same time as the display of the second communication terminal displays the telephone numbers of the first and second communication terminals; and the first and second communication terminals are capable of determining, based on which player dials a telephone number to establish the communications link, whether the first player or the second player is authorized to send a first game move instruction.

26. The apparatus of claim 25, wherein at least one of the first and second communication terminals comprises an input capable of receiving a direction causing the apparatus to change which player is authorized to send the first game move instruction.

* * * * *